Aug. 3, 1965  H. S. RAINEY  3,197,913
LIVE BAIT HOLDING AND FISH CATCHING MEANS
Filed Dec. 29, 1961
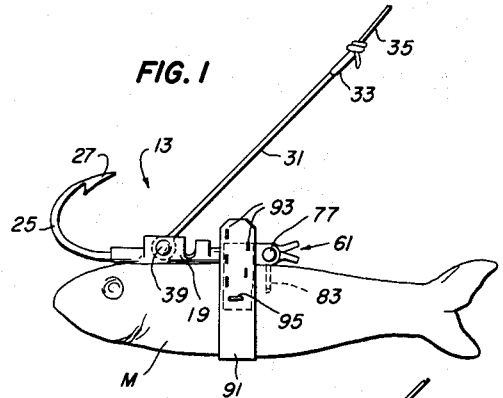
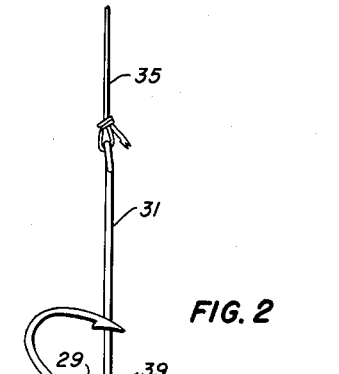
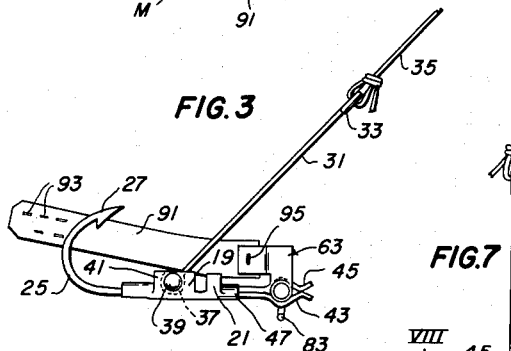
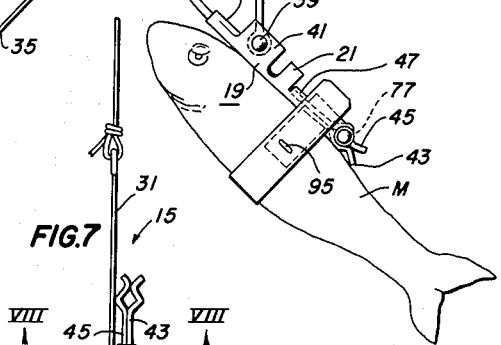
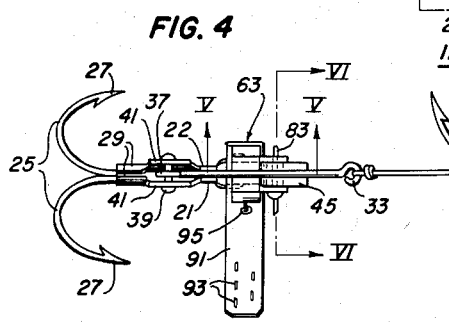
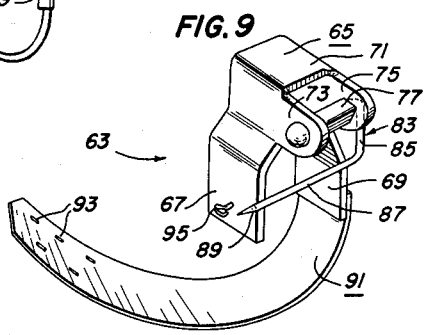
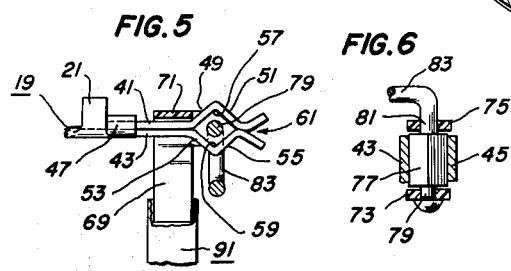
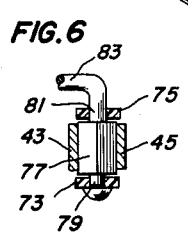
INVENTOR.
HORACE S. RAINEY
BY John R. Walker, III
Attorney

United States Patent Office 3,197,913
Patented Aug. 3, 1965

3,197,913
LIVE BAIT HOLDING AND FISH
CATCHING MEANS
Horace S. Rainey, 4674 Quince, Memphis, Tenn.
Filed Dec. 29, 1961, Ser. No. 163,130
2 Claims. (Cl. 43—44.8)

This invention relates generally to fishing devices of the type described and claimed in my co-pending applications, one of which was filed February 16, 1961, under Serial No. 89,746 and which matured into Patent No. 3,026,647 on March 27, 1962, and the other of which was filed August 14, 1961, under Serial No. 131,321, now abandoned, of which this application is a continuation-in-part. Both of these applications disclosed means by which a minnow or other live bait is held securely adjacent the fish hook in such a manner that the bait is kept alive and active for long periods of time. The latter application, Serial No. 131,321, in addition to the aforementioned bait securing means, also disclosed a means by which the hook is pivotable, so that the hook closes when the bait moves through the water, and in this closed position does not snag on weeds, brush, logs and the like.

Thus, one of the principal objects of the present invention is to provide a versatile fish catching means that can be used in one of two forms, i.e. the active live bait holding form, or the conventional hook form.

A further object is to provide such a fish catching means that can be easily and quickly converted from one of the forms to the other.

A further object is to provide such an active live bait holding form in which the live bait is held adjacent the hook in a secure manner so as to permit the bait to be cast or trolled from a boat.

A further object is to provide such an active live bait holding form in which the live bait, and particularly minnow bait, is secured to the hook in such a manner that the bait will be kept alive and active for a long period of time.

A further object is to provide, in such an active live bait holding form, means whereby the minnow or other suitable live bait is fastened securely to the hook by an impaling pin and also by an adjustable band around the bait.

A further object is to provide such an active live bait holding form whereby the minnow or other live bait will not be unduly damaged when a fish is caught so that the bait can be used again to catch another fish.

A further object is to provide, in such an active live bait holding form, means that is so arranged that the hook part thereof moves automatically to a closed position when retrieved or pulled through the water, and in this closed position will not snag on weeds, brush, logs or the like.

The means by which the foregoing and other objects of the present invention are accomplished and the manner of their accomplishment will be readily understood from the following specification upon reference to the accompanying drawings, in which:

FIG. 1 is a side elevational view of the active live bait holding embodiment, illustrating a minnow being held in the device and showing the fish hook in an open position.

FIG. 2 is a similar view, but showing the fish hook in a closed position.

FIG. 3 is a view similar to FIG. 1, but showing the minnow removed and the saddle of the live bait retainer pivoted into an upper position.

FIG. 4 is a top view of the device of FIG. 3, but showing the saddle of the live bait retainer pivoted into a downward position.

FIG. 5 is a fragmentary sectional view taken as on the line V—V of FIG. 4.

FIG. 6 is an enlarged fragmentary sectional view taken as on the line VI—VI of FIG. 4.

FIG. 7 is a side elevational view of a fish hook and line connector without the bait holding device.

FIG. 8 is an enlarged cross sectional view taken as on the line VIII—VIII of FIG. 7.

FIG. 9 is an enlarged perspective view of the live bait retainer portion per se.

Referring now to the drawings in which the various parts are indicated by numerals, the general forms of the present invention are as follows: the active live bait holding form 13, best seen in FIGS. 1, 2, 3 and 4; and the conventional hook form 15, best seen in FIG. 7.

The basic component and the part of the invention which is included in the above mentioned forms is the basic form or fish hooking means 17 that comprises an elongated member 19. Fish hooking means 17 includes resilient pieces 21, 22 which are preferably integrally formed with elongated member 19 intermediate the ends thereof and upstand therefrom in spaced relationship with each other to establish an upwardly groove 23 having a reduced mouth portion adjacent the distal upper end of the pieces 21, 22 for a purpose later to be described. Fish hooking means 17 aditionally includes a pair of hooks proper or bend portions 25, which are sometimes known as curvate bends and each of which has a terminal barb 27 at the distal end thereof. The ends of bend portions 25 opposite from barbs 27 are fixedly secured to elongated member 19 adjacent the forward end thereof by suitable means as by bending tab portions 29 of elongated member 19 over the ends. Although a pair of bend portions 25 is shown in the drawings, it will be understood that a single bend portion may be provided as in my co-pending application, Serial No. 131,321, without departing from the spirit and scope of the present invention. In addition to the above mentioned parts, fish hooking means 17 includes a shank portion 31 having the usual eyelet 33 at the upper end thereof to which is adapted to be tied the fishing line 35 in the usual manner. Shank portion 31 is pivotable relative to elongated member 19 and bent portions 25. This pivotal connection is preferably formed by providing a loop 37 in the lower end of shank porton 31 through which extends a pivot pin 39 that is fixed adjacent opposite ends thereof in aligned apertures provided through spaced ears 41 which are preferably integrally formed and upstand from elongated member 19. The diameter of shank portion 31 is slightly greater than the distance between the distal ends of pieces 21, 22 whereby the shank portion is adapted to be forced past the distal ends and snap-locked into place in groove 23 so that the shank portion is parallel with body member 19, as shown in FIG. 7. When shank portion 31 is in said snap-locked position, fish hooking means 17 is in the hook form 15 so that the device may be used in straight line fishing as pole fishing and the like. Also, fish hooking means 17 includes a gripping means adjacent the rearward end thereof, which preferably comprises a lower member 43 that is preferably integral with and formed as an extension of elongated member 19, and an upper member 45 attached to elongated member 19 by suitable means as by means of gripping tabs 47. From the attachment of upper member 45 with elongated member 19, the upper member extends rearwardly over lower member 43 in close adjacency thereto. Upper member 45 is angled upwardly as at 49 and thence angled downwardly as at 51, and lower member 43 is likewise angled downwardly as at 53 and thence angled upwardly as at 55 to establish opposing angular notches 57, 59 respectively on the inner sides of upper member 45 and lower member 43 and extending transversely of fish hooking means 17. The distal ends of upper member 45 and lower member 43 preferably diverge to establish an entranceway 61 for a purpose later to be described.

Referring now to the live bait retainer 63, which is shown by itself in FIG. 9, and which when assembled with fish hooking means 17 forms the active live bait holding form 13, the live bait retainer includes a saddle 65 which is preferably formed of plastic or the like substantially in the shape of an inverted U and which includes sides 67, 69 integrally interconnected adjacent the upper ends thereof by an upper portion 71. A pair of brackets 73, 75 are preferably respectively integrally formed with sides 67, 69 and extend rearwardly therefrom. An anchor pin 77 is square in cross section adjacent the midle part thereof and is adapted to fit in notches 57, 59 in a manner later to be described. Anchor pin 77 is cylindrical in shape adjacent opposite ends of the pin as at 79 and 81, which cylindrical portions respectively rotatably extend through aligned apertures in brackets 73, 75. An impaling pin 83 is attached to anchor pin 77 adjacent one end thereof as by forming the two pieces integral with each other. Form anchor pin 77, impaling pin 83 extends downwardly for a portion as at 85 and thence laterally back underneath and parallel with anchor pin 77 for a portion as at 87 where it terminates in a point 89. In addition, live bait retainer 63 includes a transparent flexible band 91, which is fused or otherwse secured adjacent one end to side 69. A plurality of slotted apertures 93 are provided in band 91 adjacent the opposite end thereof from the attached end of the band. Apertures 93 are adapted to selectively receive a peg 95 attached to side 67 and extending laterally therefrom.

To place live bait retainer 63 on fish hooking means 17, shank portion 31 must be unlocked from behind pieces 21, 22 and the shank moved to an angular position relative to elongated member 19. With saddle 65 being held in a horizontal position with sides 67, 69 extending forwardly, and with anchor pin 77 in line with entranceway 61, the saddle is moved forwardly to carry anchor pin 77 into entranceway 61 and to spread the upper and lower members 43, 45 apart. This movement is continued until the anchor pin 77 is seated in notches 57, 59. It will be understood that either one or both of upper and lower members 43, 45 are resilient so that once the anchor pin 77 is in notches 57, 59 the upper and lower members will return in close adjacency to retain the anchor pin therebetween, as best seen in FIGS. 3 and 5. Also, it should be noted that with anchor pin 77 held as above described between members 43, 45, the anchor pin and impaling pin 83 are held in a fixed position against pivot relative to elongated member 19 with impaling pin 83 extending laterally across and below the elongated member 19. However, it will also be noted that saddle 65 is free to pivot relative to anchor pin 77 and elongated member 19 due to the cylindrical portions 79, 81. The position of saddle 65 shown in FIG. 3 is the upper position and is the position in which it is easiest to remove or replace the bait in the live bait retainer 63, as will be understood better in the following description of the baiting thereof.

To bait live bait retainer 63, a minnow such as the minnow M shown in the drawing is placed on impaling pin 83 with the pin extending through the upper portion of the minnow above its spine intermediate the length of the minnow so that the minnow is not injured and will last a long time. Next, saddle 65 is pivoted downwardly about pin 77 to a downward position in which the saddle 65 extends substantially vertically. It will be understood that saddle 65 is stopped in said downward position by engagement of upper portion 71 with the top of elongated member 19. In said downward position saddle 65 embraces the mid-portion of minnow M with sides 67, 69 extending downwardly on opposite sides of the minnow. Next, band 91 is placed around minnow M and peg 95 is engaged through a selected one of slotted apertures 93 so that the band forms a loop which securely embraces minnow M. Thus, minnow M is carried in an optimum position for catching fish, with the minnow's head below and adjacent bend portions 25 and with its body extending rearwardly beneath elongated member 19.

From the foregoing it will be understood that barbs 27 are free of the minnow so that when a fish is caught on one of the barbs, the minnow can, in most cases, be used again since it will not be torn up by removing the barb from the fish's mouth. Also, it will be understood that although the minnow M is securely attached to the active live bait form 13, the minnow nevertheless is not so restrained that it cannot substantially freely move about. In fact, the band 91 around the minnow's mid-portion causes it to be more active since the minnow attempts to swim out of the band. In addition, it will be understood that when the minnow M is swimming about, it will exert a pull against the fishing line 35 so that the line and shank portion 31 are not depending straight downwardly but are at an angle, as shown in FIG. 1. The minnow M will be substantially horizontal which will place fish hooking means 17 in an open position as shown in this figure, in which position, as viewed from the side, barbs 27 are spaced from shank portion 31. It will be understood from this figure that fish hooking means 17 is in only one of a number of open positions, in which shank portion 31 assumes different angular positions relative to elongated member 19. Thus, when there is slack in fishing line 35 and the minnow is allowed to play about, fish hooking means 17 will be generally in one of the open positions so that the fish hook is at an optimum position to catch a fish. However, when a pull is exerted on the fishing line 35, as for example, to draw the fish hooking means 17 up for an examination of the bait or for changing to a new fishing spot, the resistance of the water against fish hooking means 17 will cause elongated member 19, minnow M and bend portions 25 to pivot clockwise, as viewed in FIGS. 1 and 2, until shank portion 31 engages a stop provided on elongated member 19, as by bending the forward edges of ears 41 together. When shank portion 31 engages said stop, fish hooking means 17 is stopped in the closed position shown in FIG. 2, in which position barbs 27 are substantially in lateral alignment with shank portion 31, with the barbs pointed substantially downwardly. It will be apparent that the above described clockwise movement of the parts will take place since the portions of elongated member 19 and minnow M to the right of pivot pin 39, as viewed in FIG. 1, offer a greater resistance to the water than the relatively smaller portions of elongated member 19 and minnow M to the left of the pivot pin. Thus, the force of the water acting against the portions to the right is greater than the force of the water acting against the portions to the left. Once fish hooking means 17 is closed, as above described, it will be seen that there is no possibility of barbs 27 catching on weeds, logs or the like, as would otherwise occur with other types of fish hooks. In addition, it should be pointed out that when fishing, if the minnow M is not active for some reason, and the fishing line 35 and shank portion 31 are depending straight downward, as in FIG. 2, the fish can still be caught since when the fish closes its mouth on minnow M and shank portion 31, it will cause the elongated member 19 to rotate counterclockwise, as viewed in FIG. 2, which then puts the bend portions 25 in position to catch the fish when it attempts to get away from the fish hooking means 17. Also, the bend portions 25, when a double fish hook is used as in the drawings, extend angularly away from shank portion 31 so that the barbs 27 are laterally spaced therefrom in position to catch a fish even when fish hooking means 17 is in said closed position.

Although the invention has been described and illustrated with respect to a preferred embodiment thereof, it is to be understood that it is not to be so limited since changes and modifications may be made therein which are within the full intended scope of this invention as hereinafter claimed.

I claim:
1. A fishing device comprising a fishhook including a shank portion, a bend portion having a terminal barb, and pivot means freely pivotally joining said bend portion and said shank portion for free pivotal movement of said fishhook between a substantially closed position in which said barb is adjacent said shank and open positions in which said barb is spaced from said shank; said pivot means including a member having a lower surface for contacting a minnow carried by said fishing device, means substantially rigidly joining said member and said bend portion, said member and said bend portion extending in substantially opposite directions away from said pivot means and said member having an area offering a greater resistance to the water than said bend portion whereby downward pivot of said member responsive to pull on said fishhook through the water is effective to cause upward pivot of said bend portion towards said closed position, said member extending in front of said shank portion to provide a stop for stopping said fishhook in said closed position, a flexible member attached adjacent one end thereof to said member adjacent one side thereof and extending therebeneath, means for adjustably and removably coupling the opposite end of said flexible member to said first mentioned member for holding a minnow, an impaling pin coupled to said first mentioned member and extending laterally relative thereto in position to pierce a minnow held by said first mentioned member, and said pin being spaced rearwardly of said flexible member.

2. Fish catching means comprising an elongated member, a bend having a barb, said bend being fixedly attached to said elongated member adjacent one end thereof, gripping means attached to said elongated member adjacent the opposite end thereof from said bend, said gripping means including upper and lower members having opposing notches therein and having an entranceway therebetween leading to said notches, at least one of said upper and lower members being resilient for the spreading apart thereof to gain entrance to said notches through said entranceway, live bait retainer means including a saddle adapted to fit over a minnow and the like, a band attached to said saddle adjacent one end thereof and means on said saddle for removably holding said band adjacent the opposite end thereof whereby said band is adapted to removably hold a minnow in said saddle, an anchor pin having a square cross section adjacent the mid-portion thereof, said anchor pin being removably held in said gripping means with the square cross section thereof engaged in said notches to hold said pin stationary relative to said elongated member, means pivotally mounting said saddle on said anchor pin to pivotally hold said live bait retainer means on said elongated member, an impaling pin attached to said anchor pin, said impaling pin extending beneath said elongated member and terminating in a point in position to pierce a minnow held in said saddle, a shank; means pivotally joining said shank to said elongated member intermediate the ends thereof for pivotal movement of said fish catching means between a substantially closed position, open positions, and a locked position; when in said substantially closed position said barb being substantially in alignment with and adjacent to said shank and when in said open positions said barb being spaced from said shank, said live bait retainer means being removable from said elongated member, means attached to said elongated member for engaging said shank when said live bait retainer means is removed from said elongated member to removably hold said fish hooking means in said locked position with said shank being adjacent said elongated member whereby said fish catching means is adapted to be used in the manner of a conventional fishhook when said live bait retainer means is removed therefrom.

References Cited by the Examiner

UNITED STATES PATENTS

| | | | |
|---|---|---|---|
| 1,255,067 | 1/16 | Thatcher | 43—44.4 |
| 1,993,582 | 3/35 | Anderson | 43—44.4 |
| 2,298,811 | 10/42 | Sisco | 43—42.38 |
| 2,501,210 | 3/50 | Cretin | 43—34.16 |
| 2,754,613 | 7/56 | Rogers et al. | 43—42.38 |
| 2,984,041 | 5/61 | Banker | 43—43.16 |
| 3,027,677 | 4/62 | Low | 43—43.16 |

FOREIGN PATENTS

| | | |
|---|---|---|
| 53,152 | 10/33 | Norway. |
| 20,753 | 3/04 | Sweden. |

ABRAHAM G. STONE, *Primary Examiner*.
JOSEPH S. REICH, *Examiner*.